US009743372B2

(12) United States Patent
Frison et al.

(10) Patent No.: US 9,743,372 B2
(45) Date of Patent: Aug. 22, 2017

(54) SYNCHRONIZATION OF OUTPUTS IN A WIRELESS FIRE SYSTEM

(71) Applicant: Honeywell International Inc., Morristown, NJ (US)

(72) Inventors: Andrea Frison, Monfalcone (IT); Daniel Polito, Cervignano del Friuli (IT); Daniel Merli, Trieste (IT)

(73) Assignee: LIFE SAFETY DISTRIBUTION AG, Hegnau (CH)

( * ) Notice: Subject to any disclaimer, the term of this patent is extended or adjusted under 35 U.S.C. 154(b) by 290 days.

(21) Appl. No.: 14/101,755

(22) Filed: Dec. 10, 2013

(65) Prior Publication Data

US 2015/0163758 A1    Jun. 11, 2015

(51) Int. Cl.
*H04W 56/00* (2009.01)
*G08B 17/00* (2006.01)
*G08B 25/10* (2006.01)

(52) U.S. Cl.
CPC .......... *H04W 56/004* (2013.01); *G08B 17/00* (2013.01); *G08B 25/10* (2013.01)

(58) Field of Classification Search
CPC ....... H04W 56/004; G03B 17/00; H04Q 7/20; H04B 7/14; H04L 12/26
See application file for complete search history.

(56) References Cited

U.S. PATENT DOCUMENTS

| | | | | |
|---|---|---|---|---|
| 2002/0055356 | A1* | 5/2002 | Dulin | H04W 56/006 455/432.2 |
| 2003/0017821 | A1* | 1/2003 | Irvin | H04W 4/02 455/410 |
| 2008/0096536 | A1* | 4/2008 | Tonosaki | H04M 1/575 455/415 |
| 2011/0194407 | A1* | 8/2011 | Ji | H04B 7/2606 370/226 |

OTHER PUBLICATIONS

Extended European search report for corresponding EP application 14194087.4, dated Apr. 21, 2015.
Neander et al., Prolonging Wireless HART Network Lifetime Using Packet Aggregation, 2011 IEEE International Symposium on Industrial Electronics (ISIE), Jun. 27, 2011, pp. 1230-1236.
Raza et al., Interconnecting WirelessHART and Legacy HART Networks, 2010 6th IEEE International Conference on Distributed Computing in Sensor Systems Workshops (DCOSSW), Jun. 21, 2010, pp. 1-8.
Petersen et al., WirelessHART Versus ISA100.11a: The Format War Hits the Factory Floor, IEEE Industrial Electronics Magazine, Dec. 1, 2011, pp. 23-34, vol. 5, No. 4.

* cited by examiner

*Primary Examiner* — Anez Ebrahim
(74) *Attorney, Agent, or Firm* — Husch Blackwell LLP

(57) ABSTRACT

A method and apparatus that including a control panel sending an activate output command, a gateway of the control panel receiving the activate output command and determining a time period until a wireless communication subsystem becomes available, the wireless subsystem (Continued)

adjusting the determined time period by determining a time until a node is available to receive the output command through the gateway and wireless subsystem, the wireless subsystem sending the output command and a value of the adjusted determined time period to the node and the node activating an output device based upon the output command and adjusted determined time period.

19 Claims, 7 Drawing Sheets

SYNCHRONIZATION OF OUTPUTS IN A WIRELESS FIRE SYSTEM

FIELD

The field relates to fire systems and more particularly to the activation of warning devices in a fire system.

BACKGROUND

Fire detection systems are generally known. Such systems are typically based upon the use of a number of fire detectors dispersed throughout a building and at least one warning device that warns occupants of the building to the presence of a fire. While each fire detector could be connected to its own warning device, fire detectors are typically connected to a common monitoring panel. This is useful because of the need to send notice of any detected fire to a central monitoring station.

However, the use of a common monitoring panel requires that a connection be established and maintained between the panel and each fire detector and each warning device. In the past, the connection was established by installing at least two wires between each fire detector and the monitoring panel and between each warning device and the monitoring panel.

More recent systems have relied upon the use of wireless transceivers to reduce the costs of installation. Such systems require a transceiver located in each of the fire detectors, the warning device and the central monitoring panel.

Still other systems have relied upon wireless transceivers within one or more of the sensors to relay signals from other sensors in a mesh network. While these systems work well, they often introduce delays those could lead to unacceptable behaviors, such as warning device not synchronized. Accordingly, a need exist for better methods of controlling such systems.

DETAILED DESCRIPTION OF AN ILLUSTRATED EMBODIMENT

Figure 1:
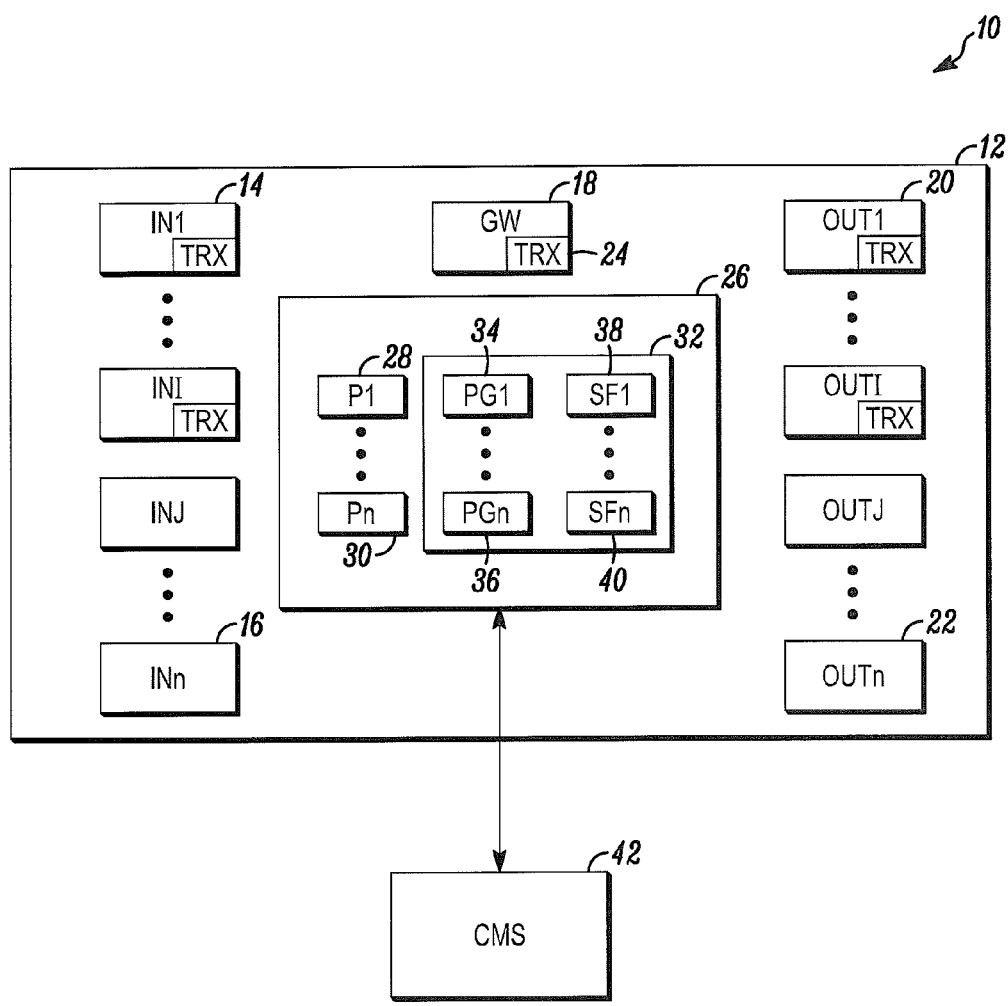
FIG. 1 is a simplified block diagram of a security system in accordance with an illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a simplified block diagram of a security system or more particularly, a fire detection system 10 shown generally in accordance with an illustrated embodiment. Included within the system may be a number of fire input devices 14, 16 used to detect threats such as from fire within a secured area 12. The fire input devices may be scattered throughout the secured area and may each include a fire detector that operates to detect fire by sensing any one or more of a number of different fire-related parameters (e.g., smoke, carbon monoxide, heat, etc.) and a manual call point.

The fire system may also include a number of different warning devices 20, 22 intended to be activated in the event of fire to warn people within the secured area. The warning devices may be any type of audio and/or visual device that attracts attention and announces the existence of a fire.

Also included within the secured area may be a control panel that monitors the sensors for indications of fire. In this regard, a wireless transceiver 24 located within at least some or all of the devices may be used to transmit notification of the detection of a fire to a corresponding transceiver within the alarm panel. Upon detecting a fire, the control panel may activate one or more of the warning devices and send an alarm message indicating a fire to a central monitoring station 26.

Included within the control panel may be one or more processor apparatus (processors) 28, 30 each operating under control of one or more computer programs 34, 36 loaded from a non-transient computer readable medium (memory) 32. As used herein, reference to a step performed by a computer program is also reference to the processor that executed that step.

In this regard, an alarm processor within the control panel may monitor a status of each of the input devices. Upon detecting activation of any of the inputs, the alarm processor may activate one or more of the warning devices and send an alarm message to the central monitoring station.

Figure 2:
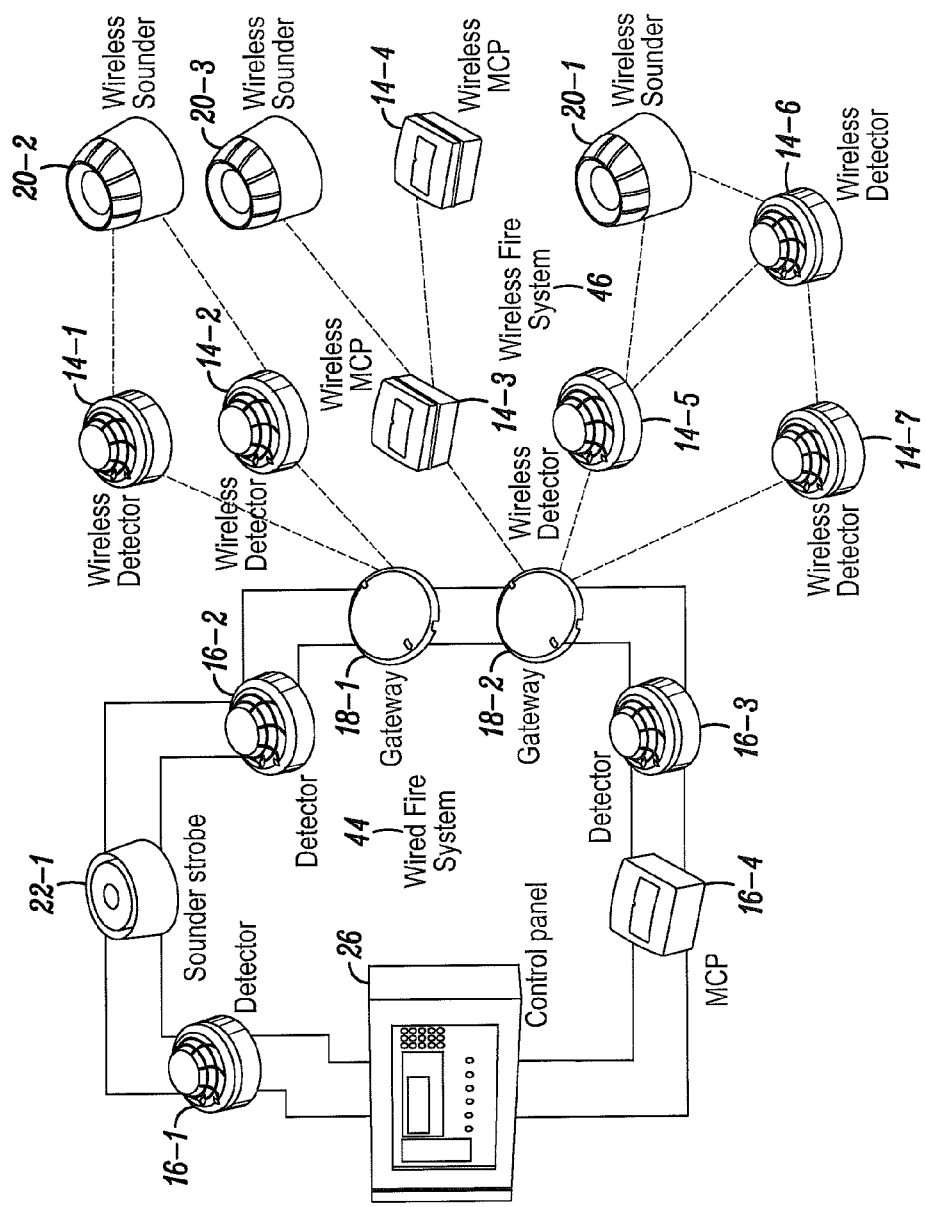
FIG. 2 is a more detailed example of the security system of FIG. 1.

FIG. 2 is a more detailed example of the fire detection system of FIG. 1. As shown in FIG. 2, the control panel may be coupled to the sensors (14, 16) and warning devices (20, 22) via a number of communication mediums 44, 46. For example, the control panel may be connected to at least some sensors 16-1, 16-2, 16-3 and manual call point 16-4 via a wired communication loop 44, 42 and a corresponding communication module 38. Similarly, the control panel may be coupled to other sensors 14-1, 14-2, 14-5, 14-6, 14-7 and manual call points 14-3, 14-4, via the communication loop 44, one or more gateways 18 (e.g., 18-1, 18-2) and a mesh network 46.

In this regard, the gateways 18 may operate to translate device coding (e.g., addresses) from a radio frequency (rf) protocol used within the radio domain to a loop protocol that, in turn, incorporates communication loop addresses recognized by the control panel on the communication loop. In this regard, the protocol used by the mesh network may be based upon any of a number of different rf protocols (e.g., the Cascading Wave Communication protocol developed by Honeywell, Inc.). This rf protocol provides a reliable deterministic redundant communication system that operates without congesting the network of FIG. 2 in high traffic scenarios.

In general, the mesh 46 forms a communication network based upon a series of parent/child relationships. The basic network element is called a node and the network root element (node 0) is referred to as the gateway or master node 18. Each node can be connected to geographically adjacent nodes via full duplex links, so that each device is able to manage communications in the direction of both network boundaries (e.g., from its children to the root and vice versa).

Each father node receives data from its children, and forwards such data packets along with its own information back to the gateway. Each child receives data from its fathers and forwards such data packets to its descendants. In this way, every node can also be considered a repeater.

During the initial activation of the system, the gateway tries to build up a mesh network with some pre programmed data. Each child can have up to two fathers, to guarantee redundancy and alternative paths to complete the data transmission to and from the gateway. In this way even if a node fails, there is always another one able to complete the communication chain. Each node, but the gateway, can have up to 4 children. The gateway can have a number of children equal to the maximum number of nodes present on the network.

Figure 3:
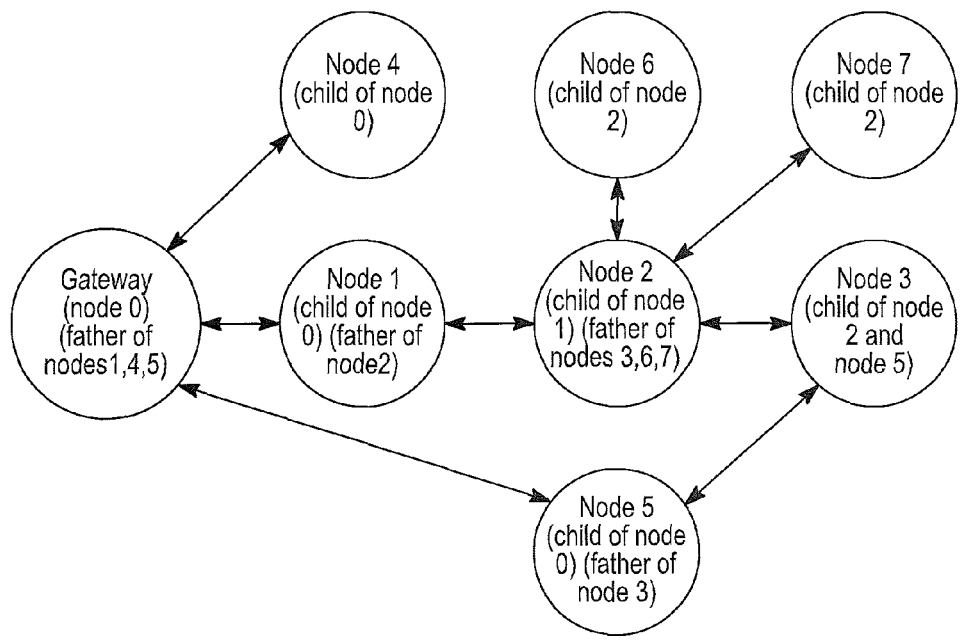
FIG. 3 depicts the parent-child relationship of the nodes of FIG. 2.

A simplified arrangement of the mesh network 46 is shown in FIG. 3. FIG. 3 highlights the father-child links between the nodes 14, 18, 20.

To avoid message collisions, the nodes in FIG. 2 may operate under a time division multiple access (TDMA) format. In this regard, each node may be assigned to operate within a predetermined slot of a repeating frame and superframe.

Figure 4:
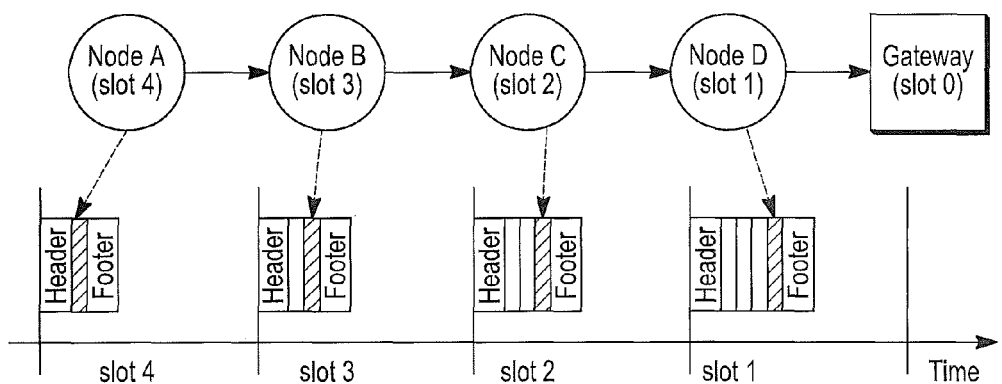
FIG. 4 depicts upstream packet usage by the nodes of FIG. 2.

In general, the communication protocol of the devices 14, 18, 20 operate under a principle called data aggregation. FIG. 4 depicts an example of this principle. FIG. 4 shows a gateway and 4 nodes, where each node transmits its data to the gateway, using the TDMA format and data aggregation.

As shown in FIG. 4, the packet transmitted by "node A" is located on the boundary farthest from the gateway. Node A transmits a packet first where the packet contains only its own data. When the packet is received by "node B", a processor of node B appends its data, if any, at the end of the packet (prior to the footer) and forwards the packet to its father node. When the packet reaches the gateway, it contains data of all 4 nodes.

To enable the efficient aggregation of data without increasing message latency, the transmit slots Tx used by the TDM mesh network are allocated in order of distance from the gateway in such a way as to have children nodes always transmit before their fathers. Thus, a child node's data is always available at the father node before and during the father's Tx slot. This allows a processor of the father to aggregate its own data with that received from its child node and transmit the data together in a single packet. In FIG. 4, network node B is the father of node A, node C is the father of node B, and so on.

As a result of aggregation, the transmission of the data of the four nodes of FIG. 4 only needs 4 slots as shown in FIG. 4. In the case of a 32 node network, it would take only 32 slots for the data of all nodes to reach the gateway and therefore to be available to the control panel.

Figure 5:
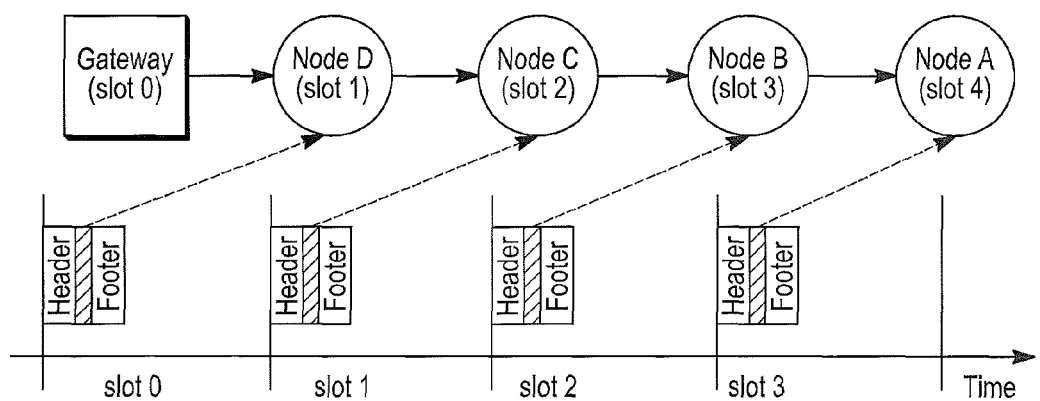
FIG. 5 depicts downstream packet usage by the nodes of FIG. 2.

Using the same protocol, the control panel can also send data to each of the network nodes as shown in FIG. 5. In this case, the aggregated message is received by the devices in accordance with its status in the father-child hierarchy. Thus node D receives the aggregated packet during the gateway's transmission slot, while node A receives the message during node B's transmission slot. In each case, a processor of the father node strips off the data intended for the father before forwarding the remainder of the data to its respective child node.

Once the links between the gateway and nodes have been established, it is necessary to maintain the synchronism among the nodes in order to avoid collisions. This may be accomplished via a synchronization message or beacon controlled by the control panel, the gateway or even one of the nodes.

Figure 6:
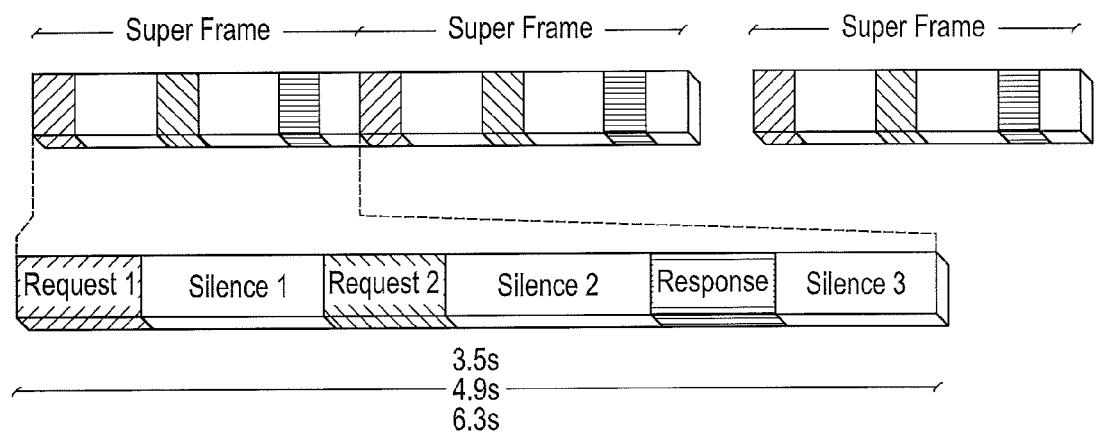
FIG. 6 depicts a super frame that may be used by the system of FIG. 1.

In addition, to maintaining synchronism, the beacon may also provide the nodes with a basis for identifying the relationship between each slot and its location within the frame and super frame. In this regard, each super frame may consist of 6 phases including two request phases, where data are sent from nodes to the gateway, one response phase, where data goes from the gateway to the nodes and three silent phases where no data are sent through the media. Each request and response phase may be separated by a silent phase as is shown in FIG. 6.

During each request phase, nodes allocated to a higher slot index number transmit first and during the response phase, nodes allocated to a lower slot index number transmit first. For example, FIG. 4 shows that node A has a slot index number of 5 so it transmits first in the request phase. Similarly, FIG. 5 shows that node D has a slot index number of 1, so it transmits first to other nodes in the response phase.

Since a message originated by the control panel is received by the nodes at different times based upon their assigned slots, the activation of outputs (e.g., warning devices) would also occur at different times. However, the synchronization of warning devices (e.g., sounders and strobes) is required in some countries. In addition, synchronization among warning devices could be required by devices belonging to different networks (on the same wired loop but connected to different gateways) and between wired and wireless output devices.

Under one illustrated embodiment, synchronization of output devices may be achieved via an output synchronization message broadcast to each device within a network. In cases where the broadcast message originates from a message processor within the control panel, all of the gateways belonging to a loop can receive the broadcast message, as well, in order to set the correct group address for the activation of warning devices.

The output synchronization message may include a system identifier of the output (warning device) to activate (or synchronize if already active). The message may include or may be modified by the gateway to include an elapsed time from when the message has been received by the gateway to when the message has been forwarded to and received by a respective node of the network. The message may also include a super frame number.

In general, the output synchronization message may be composed and adjusted by respective synchronization processors within one of the nodes, within the gateway and/or within the control panel. The synchronization message may be based upon a delay time period between receipt of an output message by the gateway from the control panel (activating a warning device) and the availability of the wireless subsystem. The delay time period of the output synchronization message may be adjusted based upon the further delay between scheduling the transmission of the message by the wireless subsystem to the target device and the time before the next occurrence of the slot assigned to the target devices.

It should be noted that timing information of each sensor or node 14, 16, 20, 22 may be saved within a respective timing file 38, 40. The timing information of each node may include parent-child relationships and slot assignments. The timing files may be saved within the control panel, the gateway and/or the respective nodes. The availability of the timing files at various locations allows the determination of delays from a number of locations within the system.

In general, by knowing the elapsed time since arrival of the message at the gateway, the output can be activated at the appropriate instant (upon the flash of a strobe) or immediately with the appropriate offset or phase from the strobe. This can be very important for sounders in order to have a correct and stable synchronization of all of the devices including both wired and wireless devices on the same or on different networks.

The description provided below will be directed primarily to warning devices such as sounders because sounders are the most difficult to synchronize. However, it should be understood that this same description and mechanisms apply to any other output device of the system of FIGS. 1 and 2.

It may be noted next that the maximum resolution that is allowed for the synchronization of sounders is based upon a master clock oscillator of the system. The master clock may include a temperature controlled crystal oscillator (TCXO) operating at 32.768 kHz and a TCXO may be included within each node. This suggests that, within the system, the maximum time difference in phase between any two sounders can be at most 1/32.768 kHz, which is about 30.5 μs.

In order to have all sounders (both wired and wireless) generate the same tone in a synchronous manner, it is necessary to lock the phase between all involved elements within the loop and mesh to the same reference. The common reference may be a clock message from the control panel that initiates a TDM synchronization messages (i.e., the beacon) transmitted by the gateway to each node. The task of synchronizing the output devices of the mesh to the output devices of the wired loop and to each other can be achieved by starting the tone generation of involved sounders of the mesh network with an offset time delay, taking into account the time interval between message reception at the gateway's wireless subsystem and the actual activation command received by a processor of the RF sounder "tone generation" subsystem within at least some of the nodes.

The output synchronization messages used to synchronize and activate the output device include a time offset field. The offset field consists of 3 bytes including a 1-byte bCoarse_Tick field and a 2-byte wFine_Tick field. The value of the bCoarse_Tick field may be determined by counting the number of coarse ticks (700 ms) elapsed (rounded down) since the Start/Synchronize message was received by the gateway's wired subsystem from the control panel. The wFine_Tick is determined by counting the number of fine ticks (approximately 30 μs) needed to reach the exact offset from the counted bCoarse_Tick*700 ms. The actual offset between receipt of the panel command and the actual start time then becomes T_Offset[μs]=(bCoarse_Tick*700*1000)+(wFine_Tick/32.768).

A more detailed description of the use of the time offset field is as follows. First the control panel sends an activate output or synchronize command directed to one or more warning devices on the wired loop. The gateway (wired subsystem) decodes the command and starts measuring the time offset while awaiting its wireless subsystem to become available. As soon as the gateways' wireless subsystem is ready, the gateway encodes (or amends) the output synchronization message containing the 3-byte field and sends it to the wireless subsystem. A processor of the gateway's wireless subsystem adjusts the offset field according to the time required to reach the first available response phase, when the message can be sent to the target node through the rf network. The output synchronization message is received by the node (i.e., the rf sounder's wireless subsystem), where a processor further adjusts the offset by adding the time required to reach the command processing instant during the next silent phase.

As soon as the response phase ends and the message has been decoded by a coding processor of the target node, it is sent to the rf sounder's sound subsystem. The sounder's sound subsystem generates tones. The message sent to the sounder's sound system includes the adjusted offset value.

A processor of the sounder's sound subsystem receives the offset field and, upon occasion, the details about which tone is to be used. A sound processor initializes its components as if the command had been received directly from the control panel. The sound processor or a separate timing processor of the sound subsystem may then delay the onset of the tone based upon the adjusted offset value. The processor may further adjust the adjusted offset value based upon its own time-slot delay starting from the beginning of the response phase. It may also further adjust the delay of the tone phase taking into account the time delay necessary for reception and processing of the determined time delay period contained within the synchronization message.

Finally, the processor of the sound subsystem may begin generating the requested tone. The tone will be in phase with other sounder's tones that are controlled by the same control panel, both wired and wireless.

Figure 7:
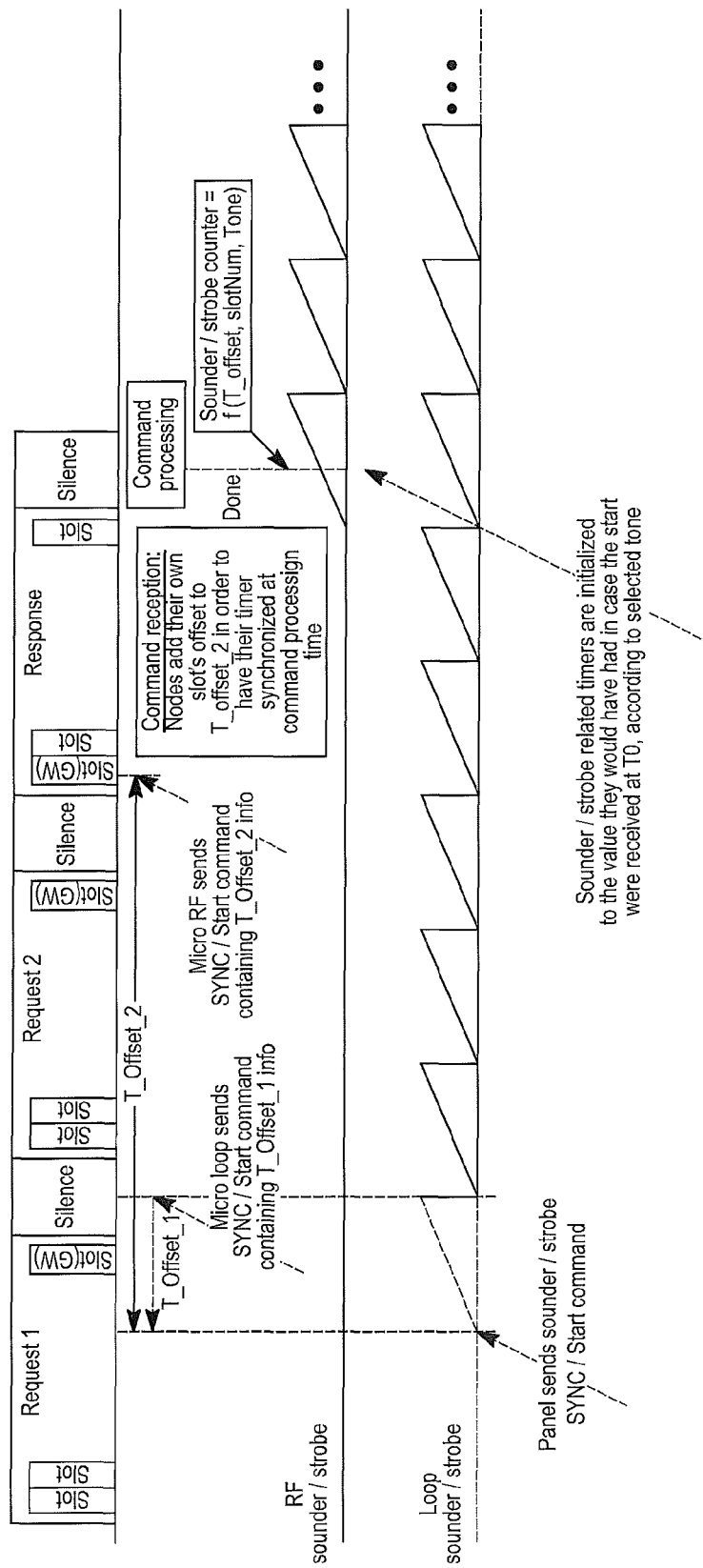
FIG. 7 is a timing diagram of output devices used by the system of FIG. 1.
Figure 8:
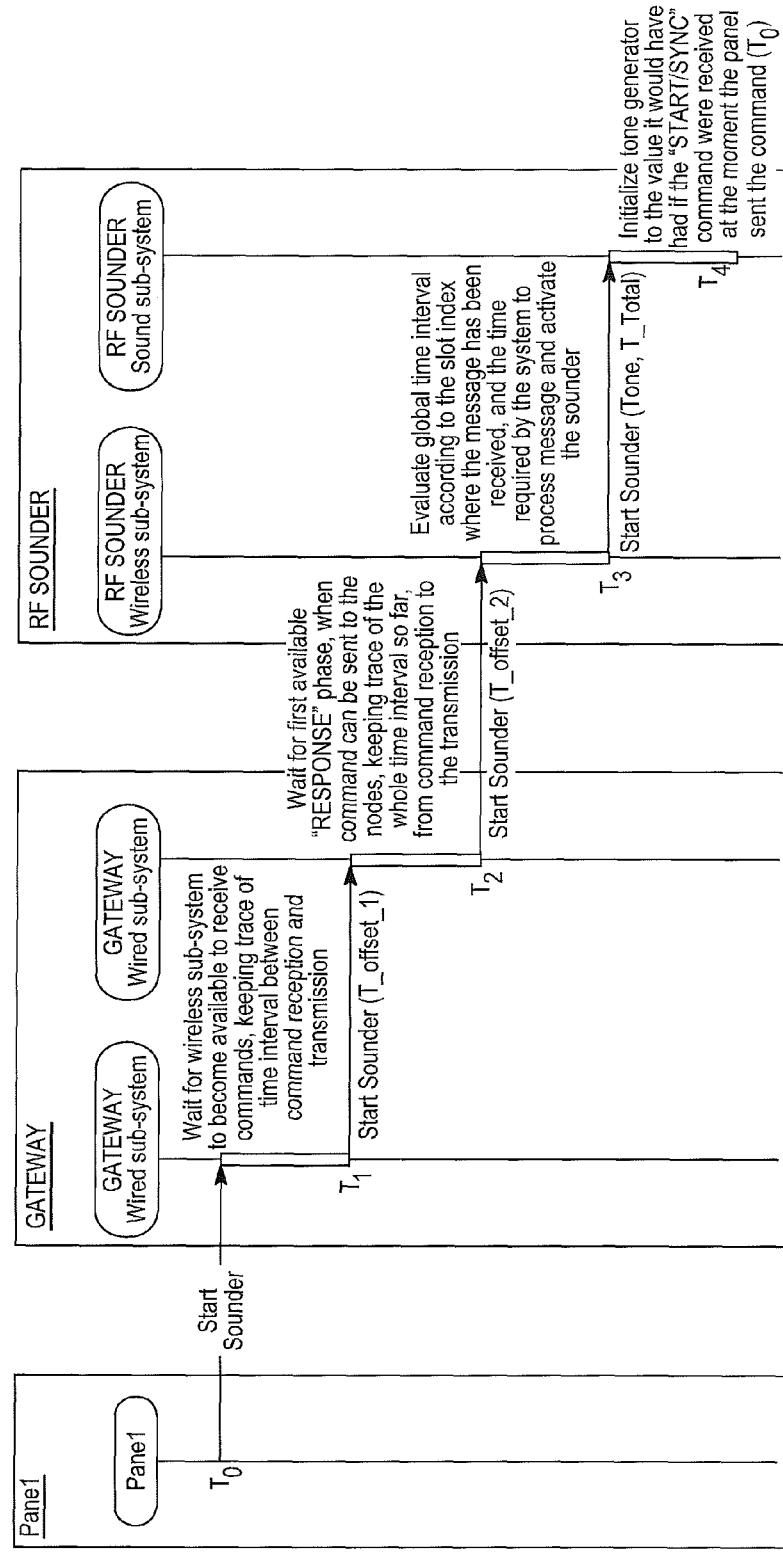
FIG. 8 depicts details of the timing diagram of FIG. 7.

FIG. 7 is a time line of the overall process described above for generating synchronized outputs within the system of FIG. 1. FIG. 8 depicts additional detail of the time line of FIG. 7. As shown in the bottom line of FIG. 7, the control panel sends a synch/start command at time To through the wired system to a targeted one or more warning devices connected to the wired system (that activates immediately) and also to the gateway. A timing processor of the gateway immediate begins at time T1 measuring a first time period or delay (T_Offset_1) until the wireless subsystem becomes available.

Once the wireless subsystem becomes available at time T2, the timing processor or a separate time processor within the wireless subsystem measures a second time period or delay until the next available slot for communicating each of the targeted wireless devices becomes available at time T3 and adjusts the first delay accordingly. It may be noted in this regard that the second delay begins in the first silent period, extends through the second request period Request 2 and into the response phase. The sum of the first delay (T_Offset_1) and second time period is equal to the adjusted offset delay (T_Offset_2). Next a further delay processor within the warning device (or gateway if processing for the node occurs within the gateway) and further adjusts the delay by a third time period equal to T4-T3 based upon the internal processing requirements of the node. The total adjusted time period (T_Offset_2 plus the third time period) offsets or otherwise delays the initiation of the wireless node's sounder (as shown in the middle time line of FIG. 7) to be in synchronism with the wired sounder (shown in the bottom line of FIG. 7). The total time period (T_Offset_2 plus the third time period) may be included within the synchronization message set to each respective warning device. Alternatively, the first and second time periods are determined and included within the synchronization message and the third time period is determined within the node that receives and processes the activation command. In this case, the total offset is determined within the node receiving the activation command and is used to activate the output at the appropriate instant.

In general, the system is defined by a method and apparatus that including a control panel sending an activate output command, a gateway of the control panel receiving the activate output command and determining a time period until a wireless communication subsystem becomes available, the wireless subsystem adjusting the determined time period by determining a time until a node is available to receive the output command through the gateway and wireless subsystem, the wireless subsystem sending the output command and a value of the adjusted determined time period to the node and the node activating an output device based upon the output command and adjusted determined time period.

Alternatively, the system is defined by an apparatus including a node, a control panel that sends an activate output command to the node, a gateway of the control panel having a processor, a wireless subsystem of the gateway, the processor of the gateway receives the activate output command and determines a time period until a wireless communication subsystem of the gateway becomes available, a processor of the wireless subsystem that adjusts the determined time period by determining a time until the node is available to receive the output command through the gateway and wireless subsystem, a processor of the wireless subsystem that sends the output command and a value of the adjusted determined time period to the child node and a processor of the node that activates an output device based upon the output command and adjusted determined time period.

In an alternate embodiment, the system is defined by an apparatus that includes a plurality of nodes, a control panel that sends an activate output command to one of the plurality of nodes, a gateway of the control panel having a processor, a wireless subsystem of the gateway, the processor of the gateway receives the activate output command and determines a time period until a wireless communication subsystem of the gateway becomes available, a processor of the wireless subsystem that adjusts the determined time period by determining a time until the node is available to receive the output command through the gateway and wireless subsystem, a processor of the wireless subsystem that sends the output command and a value of the adjusted determined time period to the child node and a processor of the node of gateway that further adjusts the determined time period and then activates an output device based upon the output command and further adjusted determined time period.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A method comprising:
    a control panel sending an activate output command, wherein the activate output command instructs an output device to activate an audible or visual output indicating an alarm scenario;
    a gateway of the control panel receiving the activate output command and determining a time period until a wireless communication subsystem becomes available;
    the wireless communication subsystem adjusting the time period by determining a time until a node is available to receive the activate output command through the gateway and the wireless communication subsystem, wherein the time until the node is available to receive the activate output command through the gateway and the wireless communication subsystem is determined based on an occurrence of a transmission slot within a time division multiplexing (TDM) super frame;
    the wireless communication subsystem sending the activate output command and a value of the time period as adjusted to the node; and
    the node activating the output device based upon the activate output command and the time period as adjusted.

2. The method as in claim 1 further comprising the control panel and the gateway routing the activate output command to one of a plurality of nodes, wherein the plurality of nodes includes the node.

3. The method as in claim 2 wherein the plurality of nodes are arranged into a mesh network.

4. The method as in claim 3 wherein the control panel, the gateway, and the plurality of nodes comprise a security system reporting a security threat.

5. The method as in claim 4 further comprising detecting the security threat through one of the plurality of nodes and the one of the plurality of nodes transmitting the activate output command in response to the security threat.

6. The method as in claim 4 wherein the output device comprises a first audible alarm alerting occupants of a secured area of the security threat.

7. The method as in claim 6 further comprising synchronizing a second audible alarm with the first audible alarm, wherein the second audible alarm is coupled to a wired loop between the control panel and the gateway.

8. The method as in claim 2 wherein the wireless communication subsystem communicates with the plurality of nodes using the TDM super frame.

9. The method as in claim 2 further comprising dividing the TDM super frame into six phases, including two request phases, one response phase, and three silent phases, wherein each of the two request phases and the one response phase are separated by one of the three silent phases, wherein the two request phases send data from some of the plurality of nodes to the control panel, and wherein the one response phase sends data from the control panel to the plurality of nodes.

10. The method as in claim 2 further comprising:
    a parent one of the plurality of nodes receiving child data from a child one of the plurality of nodes;
    appending parent node data; and
    retransmitting the child data and the parent data to the control panel through the wireless communication subsystem.

11. The method as in claim 10 further comprising;
    the control panel transmitting control panel data to the one of the plurality of nodes, wherein the control panel data includes first data to the child one of the plurality of nodes that is appended to second data to the parent one of the plurality of nodes;
    the parent one of the plurality of nodes receiving the control panel data;
    the parent one of the plurality of nodes removing the second data; and
    the parent node retransmitting the first data.

12. An apparatus comprising:
    a node;

an output device;
a control panel that sends an activate output command to the node, wherein the activate output command instructs the output device to activate an audible or visual output indicating an alarm scenario;
a gateway of the control panel having a gateway processor;
a wireless subsystem of the gateway, wherein the gateway processor receives the activate output command and determines a time period until the wireless subsystem of the gateway becomes available;
a subsystem processor of the wireless subsystem that adjusts the time period by determining a time until the node is available to receive the activate output command through the gateway and the wireless subsystem and sends the activate output command and a value of the time period as adjusted to the node, wherein the time until the node is available to receive the activate output command through the gateway and the wireless subsystem is determined based on an occurrence of a transmission slot within a time division multiplex (TDM) super frame; and
a node processor of the node that activates the output device based upon the activate output command and the adjusted time period.

13. The apparatus as in claim 12 wherein the node comprises a plurality of nodes including a parent node and a child node.

14. The apparatus as in claim 13 wherein the plurality of nodes comprises a mesh network.

15. The apparatus as in claim 14 wherein the control panel, the gateway, and the plurality of nodes comprise a security system.

16. The apparatus as in claim 15 wherein at least some of the plurality of nodes comprise intrusion sensors.

17. The apparatus as in claim 16 wherein the output device comprises an audible alarm that alerts occupants of a secured area to a security threat.

18. An apparatus comprising:
a plurality of nodes;
a plurality of output devices;
a control panel that sends an activate output command to one of the plurality of nodes, wherein the activate output command instructs the plurality of output devices to activate an audible or visual output indicating an alarm scenario;
a gateway of the control panel having a gateway processor;
a wireless subsystem of the gateway, wherein the gateway processor receives the activate output command and determines a time period until the wireless subsystem of the gateway becomes available;
a subsystem processor of the wireless subsystem that adjusts the time period by determining a time until the plurality of nodes is available to receive the activate output command through the gateway and the wireless subsystem and sends the activate output command and a value of the adjusted time period to the plurality of nodes, wherein the time until the plurality of nodes is available to receive the activate output command through the gateway and the wireless subsystem is determined based on an occurrence of a transmission slot within a time division multiplex (TDM) super frame; and
a node processor of each of the plurality of nodes that further adjusts the time period further adjusts the determined time period based upon internal processing requirements of each of the plurality of nodes and activates the plurality of output devices based upon the activate output command and the further adjusted time period.

19. The apparatus as in claim 18 wherein the plurality of nodes comprises a mesh network.

* * * * *